(12) United States Patent
Shearer et al.

(10) Patent No.: US 10,813,262 B2
(45) Date of Patent: Oct. 27, 2020

(54) SYSTEM AND METHOD FOR GENERATING A PRESCRIPTION MAP FOR AN AGRICULTURAL IMPLEMENT BASED ON YIELD MAP AND/OR CROP BIOMASS

(71) Applicant: CNH Industrial America LLC, New Holland, PA (US)

(72) Inventors: Scott Shearer, Hilliard, OH (US); Andrew Klopfenstein, West Jefferson, OH (US); Brittany Schroeder, Cloverdale, OH (US)

(73) Assignee: CNH Industrial America LLC, New Holland, PA (US)

( * ) Notice: Subject to any disclaimer, the term of this patent is extended or adjusted under 35 U.S.C. 154(b) by 197 days.

(21) Appl. No.: 16/162,151

(22) Filed: Oct. 16, 2018

(65) Prior Publication Data
US 2020/0113113 A1  Apr. 16, 2020

(51) Int. Cl.
| A01B 33/16 | (2006.01) |
| A01B 79/00 | (2006.01) |
| A01B 41/06 | (2006.01) |
| A01B 63/00 | (2006.01) |
| A01B 35/32 | (2006.01) |
| A01B 33/08 | (2006.01) |

(52) U.S. Cl.
CPC .............. *A01B 33/16* (2013.01); *A01B 35/32* (2013.01); *A01B 41/06* (2013.01); *A01B 63/008* (2013.01); *A01B 79/005* (2013.01); *A01B 33/08* (2013.01)

(58) Field of Classification Search
CPC ......... A01B 33/16; A01B 35/32; A01B 41/06; A01B 63/008; A01B 79/005; A01B 33/08

USPC .......................................................... 701/50
See application file for complete search history.

(56) References Cited

U.S. PATENT DOCUMENTS

| 5,995,895 A | 11/1999 | Watt et al. |
| 6,236,907 B1 | 5/2001 | Hauwiller et al. |
| 8,393,137 B1 * | 3/2013 | Crosby .................. A01D 91/04 56/341 |

(Continued)

*Primary Examiner* — Gertrude Arthur Jeanglaude
(74) *Attorney, Agent, or Firm* — Rebecca L. Henkel; Rickard K. DeMille (57) ABSTRACT

In one aspect, the present subject matter is directed to a method for maintaining a desired amount of residue coverage in a field during a tillage operation. The method includes generating, with a computing device, an available residue map that includes an amount of available residue at each location of the field using a yield map and/or crop biomass. The method also includes generating, with the computing device, a desired residue coverage map that includes a desired amount of residue coverage for each location within the field. Further, the method includes determining, with the computing device, an amount of residue that needs to be incorporated into the surface of the field based on the available residue map and the desired residue coverage map. Moreover, the method includes generating, with the computing device, a prescription map for the field based on a correlation between a tillage parameter of one or more ground-engaging tools of the implement and the amount of residue that needs to be incorporated into the surface of the field. In addition, the method includes controlling the tillage parameter based on the prescription map during the tillage operation to maintain the desired amount of residue coverage at each of the locations in the field.

20 Claims, 9 Drawing Sheets

(56) References Cited

U.S. PATENT DOCUMENTS

| | | |
|---|---|---|
| 8,463,510 B2 | 6/2013 | Knapp |
| 9,147,110 B2 | 9/2015 | Anderson et al. |
| 9,282,688 B2 | 3/2016 | Casper et al. |
| 9,405,039 B2 | 8/2016 | Anderson |
| 10,029,812 B1* | 7/2018 | Crosby ................... B65B 11/02 |
| 2008/0140431 A1 | 6/2008 | Anderson et al. |
| 2011/0010213 A1 | 1/2011 | Peterson et al. |
| 2016/0247075 A1 | 8/2016 | Mewes et al. |
| 2017/0112043 A1 | 4/2017 | Nair et al. |
| 2017/0215330 A1 | 8/2017 | Missotten et al. |
| 2018/0027179 A1* | 1/2018 | Matsuzaki ......... H04N 5/23212 |
| | | 348/38 |
| 2018/0049361 A1 | 2/2018 | Zemenchik |
| 2018/0092295 A1 | 4/2018 | Sugumaran et al. |
| 2018/0108123 A1 | 4/2018 | Baurer et al. |
| 2018/0114305 A1 | 4/2018 | Strnad et al. |
| 2018/0206393 A1 | 7/2018 | Stoller et al. |
| 2019/0073534 A1* | 3/2019 | Dvir ........................ G06K 9/00 |

* cited by examiner

SYSTEM AND METHOD FOR GENERATING A PRESCRIPTION MAP FOR AN AGRICULTURAL IMPLEMENT BASED ON YIELD MAP AND/OR CROP BIOMASS

FIELD

The present subject matter relates generally to agricultural implements and, more particularly, to a system and method for generating a prescription map that includes penetrations depths for an agricultural implement based on yield map and/or crop biomass.

BACKGROUND

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and/or by slowing down seed germination. Excessive residue may also serve as a source of inoculum for crop disease. As such, the ability to monitor the amount of crop residue remaining within a field can be very important to maintaining a healthy, productive field, particularly when it comes to performing tillage operations.

Conventional practices for maintaining a certain amount of residue coverage across a field during a tillage operation include setting a predetermined penetration depth for the ground-engaging tools of the implement. However, the desired amount of residue coverage may vary significantly across portions of the field, e.g. due to soil compaction, ground elevation, soil type and/or texture, ground coverage (i.e. grass, hay, crops, etc.), or similar. Conventional tillage practices do not consider such variations when setting the predetermined depths for the ground-engaging tools.

Accordingly, an improved system and method for generating a prescription map that includes penetrations depths for the ground-engaging tools of an agricultural implement that overcomes one or more of the issues in the prior art would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for maintaining a desired amount of residue coverage in a field during a tillage operation. The method includes generating, with a computing device, an available residue map that includes an amount of available residue at each location of the field using a yield map and/or crop biomass. The method also includes generating, with the computing device, a desired residue coverage map that includes a desired amount of residue coverage for each location within the field. Further, the method includes determining, with the computing device, an amount of residue that needs to be incorporated into the surface of the field based on the available residue map and the desired residue coverage map. Moreover, the method includes generating, with the computing device, a prescription map for the field based on a correlation between a tillage parameter of one or more ground-engaging tools of the implement and the amount of residue that needs to be incorporated into the surface of the field. In addition, the method includes controlling the tillage parameter based on the prescription map during the tillage operation to maintain the desired amount of residue coverage at each of the locations in the field.

In another aspect, the present subject matter is directed to a method for generating a prescription map for maintaining a desired amount of residue coverage in a field during a tillage operation. The method includes generating, with a computing device, an available residue map that includes an amount of available residue at each location of the field using a yield map and/or crop biomass. The method also includes generating, with the computing device, a desired residue coverage map that includes a desired amount of residue coverage for each location within the field. Further, the method includes generating, with the computing device, a residue incorporation map that includes an amount of residue that needs to be incorporated into each location of the field based on the available residue map and the desired residue coverage map. Moreover, the method includes generating, with the computing device, a prescription map for the field based on a correlation between a penetration depth of one or more ground-engaging tools of the implement and the residue incorporation map. In addition, the method includes storing the prescription map into at least one of a vehicle controller of a work vehicle or an implement controller of an implement for use during the tillage operation to maintain the desired amount of residue coverage at each of the locations in the field.

In yet another aspect, the present subject matter is directed to a system for maintaining a desired amount of residue coverage in a field during a tillage operation. The system includes at least one controller for controlling a work vehicle and an implement during the tillage operation. The controller includes at least one processor and associated memory. The memory is configured to store instructions that, when implemented by the processor, configure the controller to perform one or more operations, including hut not limited generating an available residue map that includes an amount of available residue at each location of the field using a yield map and/or crop biomass, generating a desired residue coverage map that includes a desired amount of residue coverage for each location within the field, determining an amount of residue that needs to be incorporated into the surface of the field based on the available residue map and the desired residue coverage map, generating a prescription map for the field based on a correlation between a tillage parameter of one or more ground-engaging tools of the implement and amount of residue that needs to be incorporated into the surface of the field, and storing the prescription map in the memory for use during the tillage operation to maintain the desired amount of residue coverage at each of the locations in the field.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for generating a prescription map for ground-engaging tools, particularly the front disk gangs, of an agricultural implement so as to maintain a desired amount of residue coverage in a field during a tillage operation. In several embodiments, the prescription map(s) of the present disclosure are generated from crop yield map and/or crop biomass. More specifically, the system is configured to generate an available residue map that includes an amount of available residue at each location of the field using a yield map and/or crop biomass and a desired residue coverage map that includes a desired amount of residue coverage for each location within the field. As such, the system can determine an amount of residue that needs to be incorporated into the surface of the field based on the available residue map and the desired residue coverage map. Accordingly, the system can generate a prescription map for the field based on a correlation between the penetration depth of the ground-engaging tools and the amount of residue that needs to be incorporated into the soil. Thereafter, the system can automatically adjust the penetration depth(s) of the ground-engaging tools in a manner that increases or decreases, as desired, the amount of crop residue remaining in the field following the tillage operation.

Figure 1:
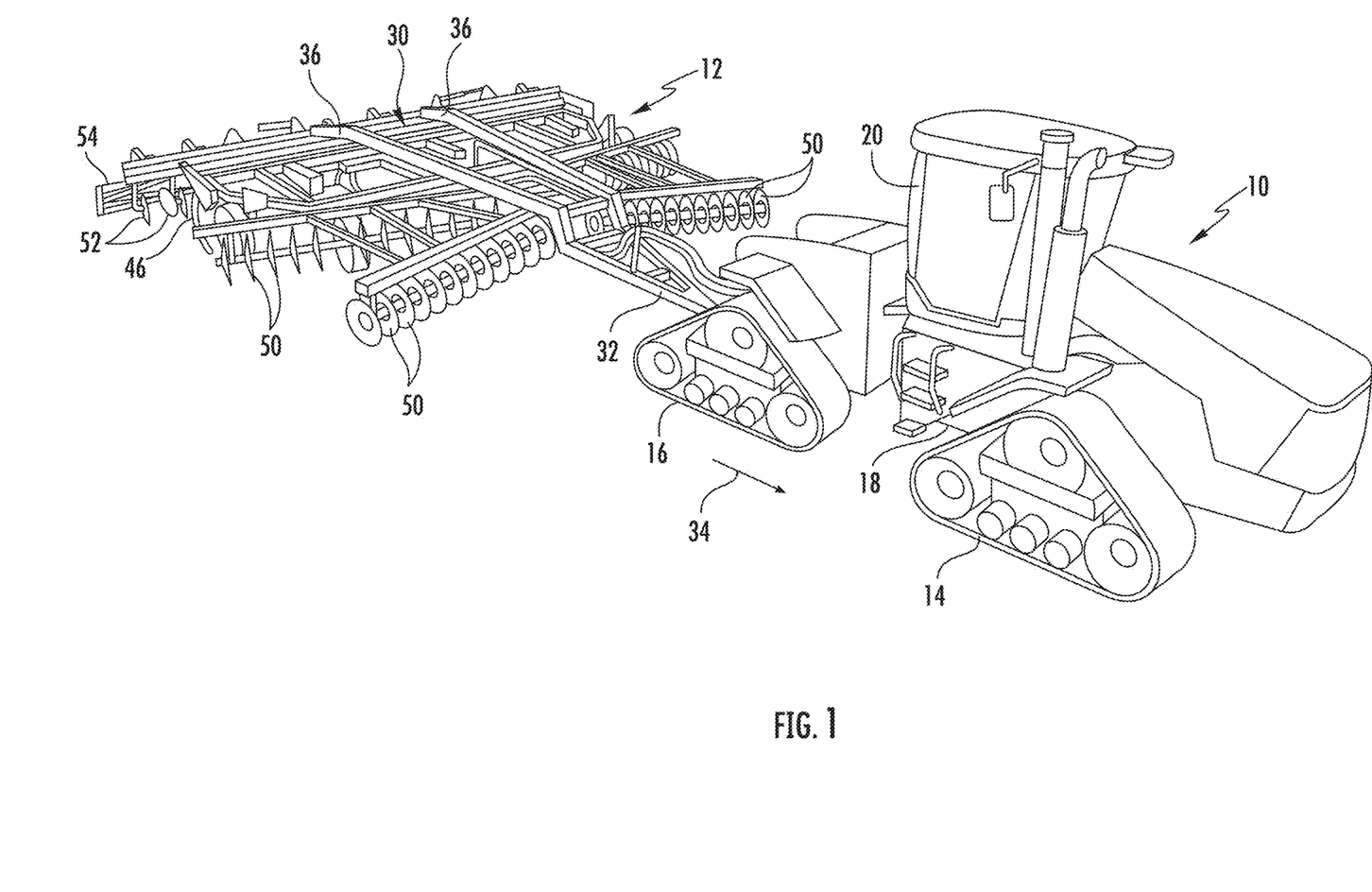
FIG. 1 illustrates a perspective view of one embodiment of a work vehicle towing a tillage implement in accordance with aspects of the present subject matter.
Figure 2:
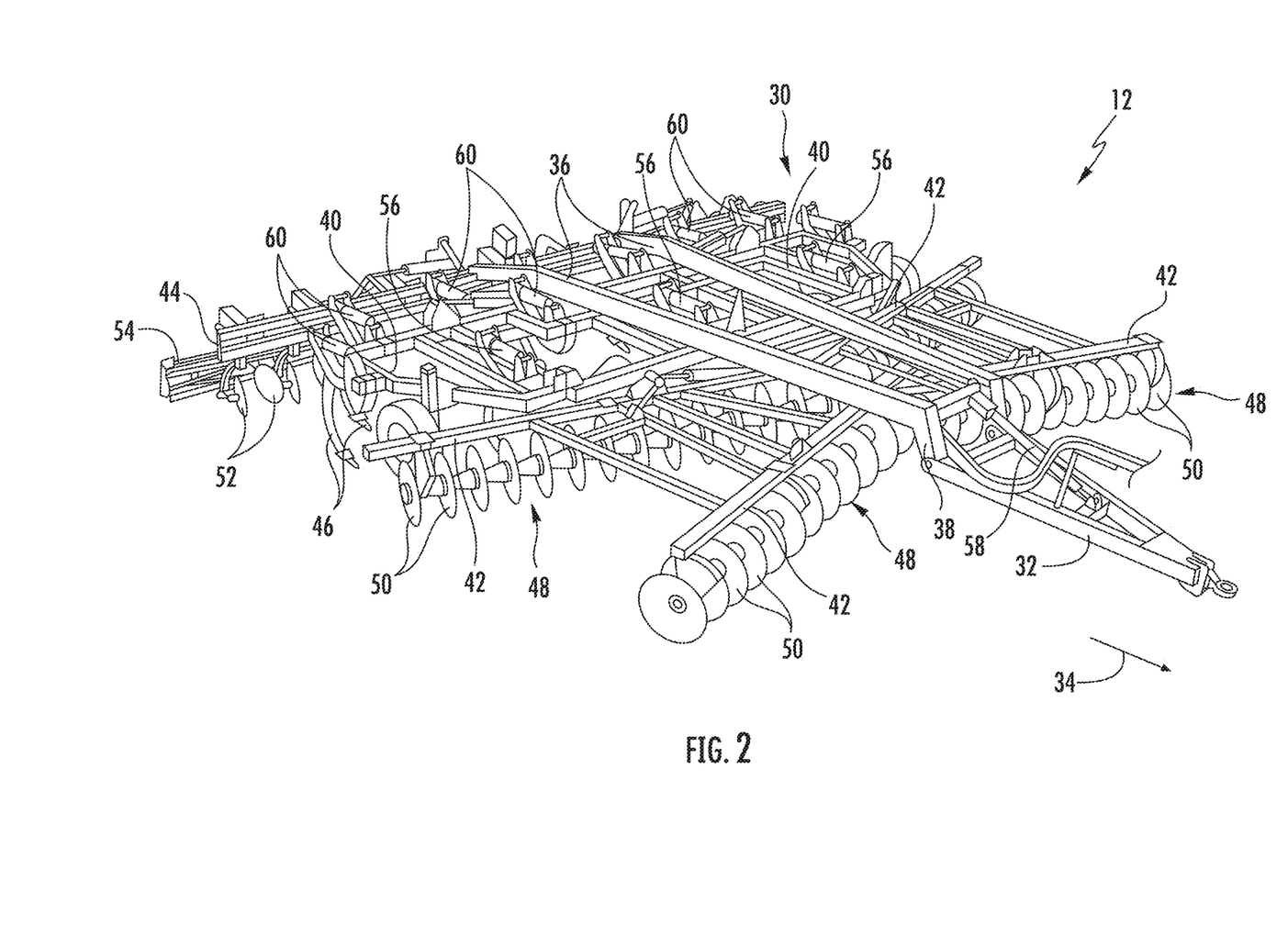
FIG. 2 illustrates a perspective view of the tillage implement shown in FIG. 1.

Referring now to drawings. FIGS. 1 and 2 illustrate perspective views of one embodiment of a work vehicle 10 and an associated agricultural tillage implement 12 in accordance with aspects of the present subject matter. Specifically, FIG. 1 illustrates a perspective view of the work vehicle 10 towing the tillage implement 12 (e.g., across a field). Additionally, FIG. 2 illustrates a perspective view of the tillage implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair of rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the tillage implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the tillage implement 12.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the tillage implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the tillage implement 12 may also include any number of suitable actuators (e.g., hydraulic cylinders) for adjusting the relative positioning, penetration depth, and/or down force associated with the various ground-engaging tools 46, 50, 52, 54. For instance, the tillage implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the tillage implement 12 may include one or more second actuators 58 coupled to the disk forward frame 42 to adjust the penetration depth and/or the down pressure of the disk blades 50 (also referred to herein interchangeably as the front disk gangs). Moreover, the tillage implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the tillage implement 12 described above and shown in FIGS. 1 and 2 is only provided for exemplary purposes. Thus, it should be appreciated that the present subject matter may be readily adaptable to any manner of tillage implement configuration. For example, as indicated above, each frame section of the tillage implement 12 may be configured to support any suitable type of ground-engaging tools, such as by installing closing disks on the aft frame 44 of the tillage implement 12.

Figure 3:
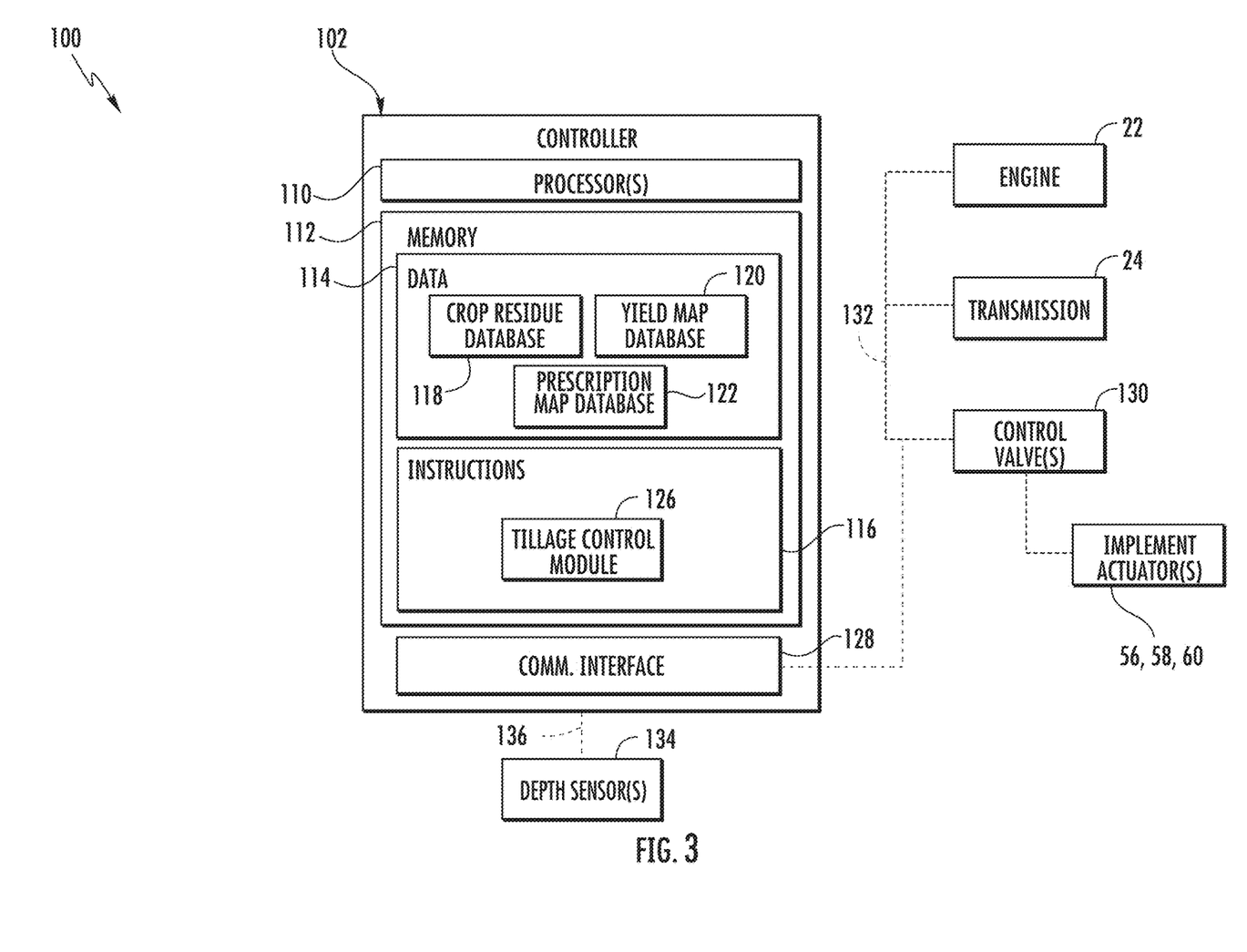
FIG. 3 illustrates a schematic view of one embodiment of a system for maintaining a desired amount of residue coverage in a field during a tillage operation in accordance with aspects of the present subject matter.

Referring now to FIG. 3, a schematic view of one embodiment of a system 100 for maintaining a desired amount of residue coverage in a field during a tillage operation is illustrated in accordance with aspects of the present subject matter. In general, the system 100 will be described herein with reference to the work vehicle 10 and the tillage implement 12 described above with reference to FIGS. 1 and 2. However, it should be appreciated that the disclosed system 100 may generally he utilized with work vehicles having any suitable vehicle configuration and/or tillage implements have any suitable implement configuration.

In several embodiments, the system 100 may include a controller 102 and various other components configured to be communicatively coupled to and/or controlled by the controller 102, such as various components of the work vehicle 10 and/or the tillage implement 12. In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, hut also refers to a controller, a microcontroller, a microcomputer, an Electronic Control Unit (ECU), a programmable logic controller (PLC), an application specific integrated circuit, and other programmable circuits. Additionally, the memory 112 may generally comprise memory element(s) including, but not limited to, computer readable medium (e.g., random access memory (RAM)), a hard disk drive (HDD), a solid-state drive (SSD), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

Figure 4:
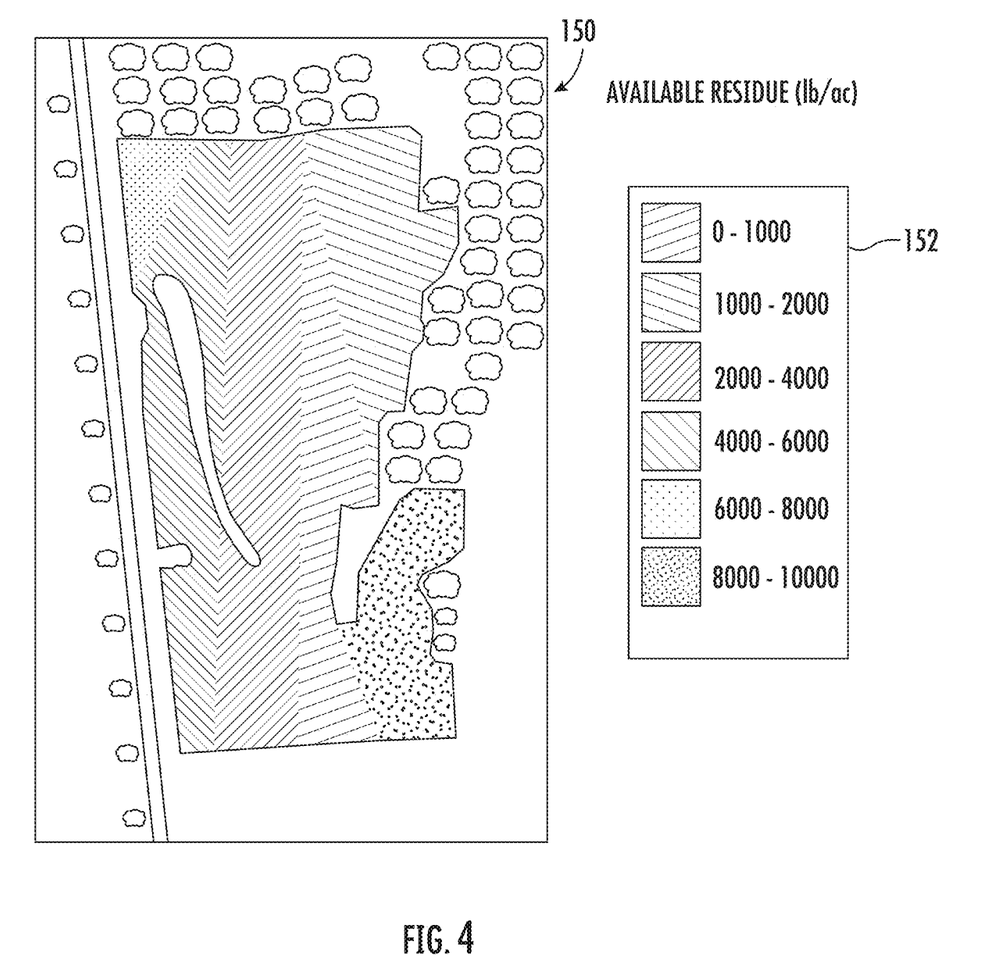
FIG. 4 illustrates a graph of one embodiment of residue (y-axis) versus yield (x-axis) to illustrate a relationship between crop yield of the field and the amount of residue on the surface of the field in accordance with aspects of the present subject matter.
Figure 5:
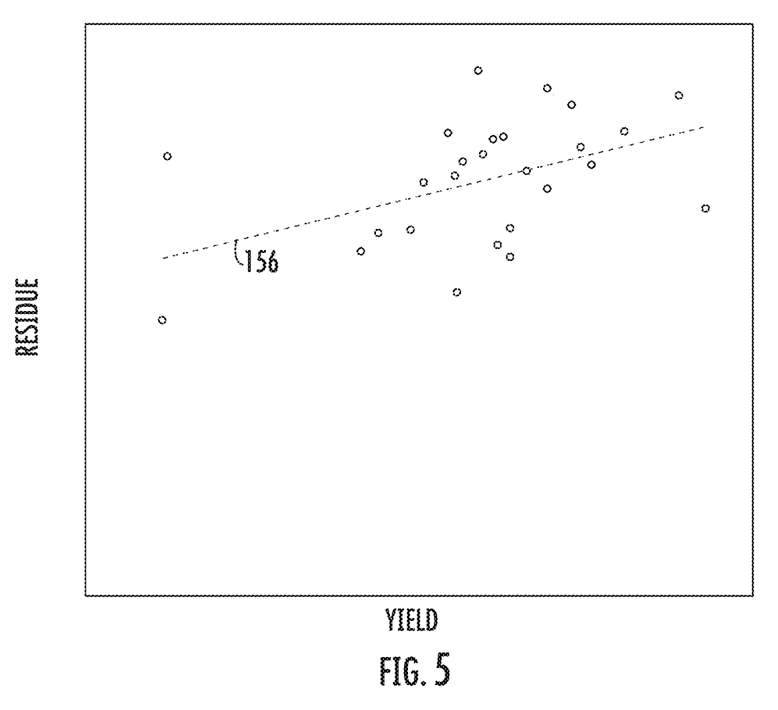
FIG. 5 illustrates a schematic diagram of one embodiment of an available residue map depicting the amount of available residue on a surface of a field in accordance with aspects of the present subject matter.

In several embodiments, the data 114 may be stored in one or more databases. For example, as shown, the memory 112 may include a crop residue database 118 for storing information related to crop residue parameters for the field being tilled. For example, as shown in FIG. 4, the controller 102 may be configured to generate an available residue map 150 that includes the available residue 152 at each location in the field. As shown, the varying amounts of residue 152 at each location in the field are illustrated by the varying shading superimposing the map of the field. More specifically, in one embodiment, the available residue map 150 may be generated based on a yield map and/or crop biomass of the field. In such embodiments, the controller 102 may include a yield map and/or crop biomass database 120 (FIG. 3) that includes information relating to the crop yield (which is a proxy for crop biomass) of the field. In other words, the mass of the above ground plant biomass (e.g. corn) is roughly equivalent to harvested grain mass. Therefore, remote sensing imagery and vegetative indices can be used to assess crop biomass. For example, as shown in FIG. 5, the controller 102 may assume that the crop yield is proportional to the amount of residue in the field based on a predetermined relationship (as indicated by dashed line 156). Therefore, by knowing this relationship, the controller 102 can generate a yield map that provides the crop yield at each of the geographic positions in the field, which can then be used to generate the available residue map 150.

Figure 6:
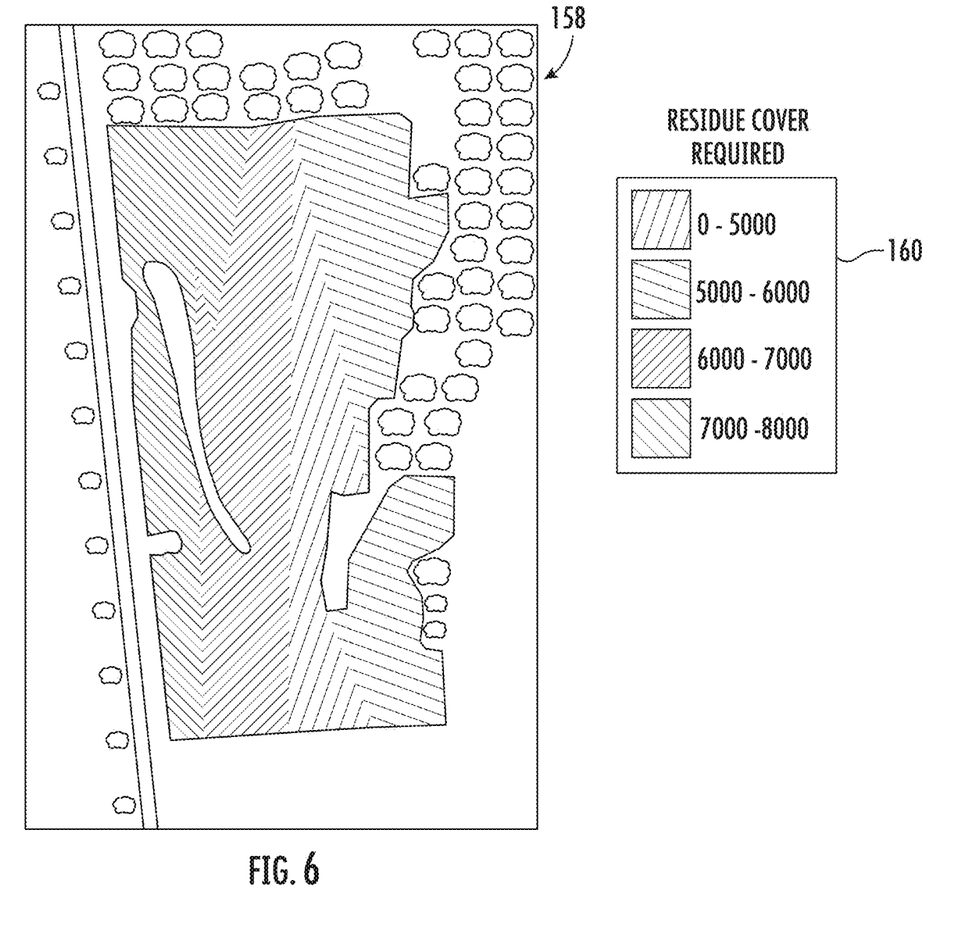
FIG. 6 illustrates a schematic diagram of one embodiment of a desired residue coverage map depicting the desired amount of residue coverage to maintain on a surface of a field in accordance with aspects of the present subject matter.
Figure 7:
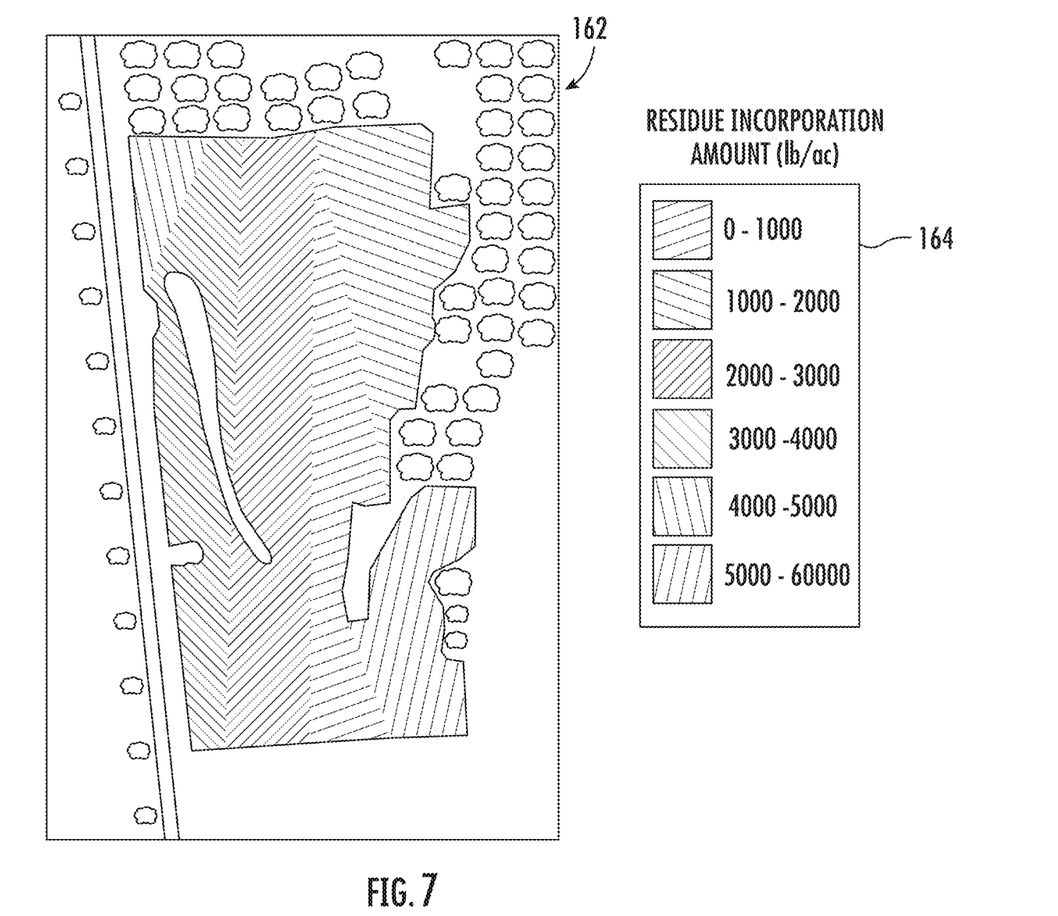
FIG. 7 illustrates a schematic diagram of one embodiment of a residue incorporation map depicting the amount of residue to incorporate into a surface of a field to maintain the desired residue coverage on the surface of the field in accordance with aspects of the present subject matter.

Referring particularly to FIG. 6, the controller 102 may also be configured to generate a desired residue coverage map 158 for the field via the crop residue database 118 that includes a desired amount of residue coverage 160 for each location within the field. For example, in one embodiment, the controller 102 may be configured to determine the desired residue coverage map 158 based on digital elevation map (DEM) data, elevation data of the field, soil type and/or texture, soil compaction levels, or any other suitable information relating to the field.

Thus, the controller 102 can determine an amount of residue that needs to be incorporated into the surface of the field based on the available residue map and/or the desired residue coverage map. More specifically, in one embodiment, the controller 102 may generate a residue incorporation map 162, such as the map illustrated in FIG. 7 that indicates the amount of residue to incorporate into the soil at each geographic location of the field. The available residue map 150, the desired residue coverage map 158, and/or the residue incorporation map 162 generated by the controller 102 may then be stored within the crop residue database 118 for subsequent processing and/or analysis. As used herein, a "map" generally refers to any suitable data structure that correlates two or more data points, such as for example, look-up tables (LUTs), charts, graphs, or as illustrated in FIGS. 4 and 6-8, two-dimensional images of the field having data points or areas superimposed onto certain locations in the field, and/or similar.

Referring back to FIG. 3, the memory 112 may also include a prescription map database 122 for generating or updating a prescription map 166 for the field based on a correlation between a tillage parameter of one or more ground-engaging tools of the implement 12 and the amount of residue that needs to be incorporated into the surface of the field (e.g. as set forth by the residue incorporation map 162). For example, in one embodiment, the tillage parameter may include a penetration depth and/or a down pressure associated with the one or more ground-engaging tools of the implement 12. Thus, in such embodiments, increased penetration depths may be associated with more residue being incorporated into the surface of the field, whereas decreased penetration depths may be associated with less residue being incorporated into the surface of the field. In additional embodiments, the controller 102 may also consider one or more additional parameters of the field when generating the prescription map(s) 166 described herein. For example, in one embodiment, the additional parameter (s) may include clod size, soil type and/or texture, moisture content, and/or similar.

Figure 8:
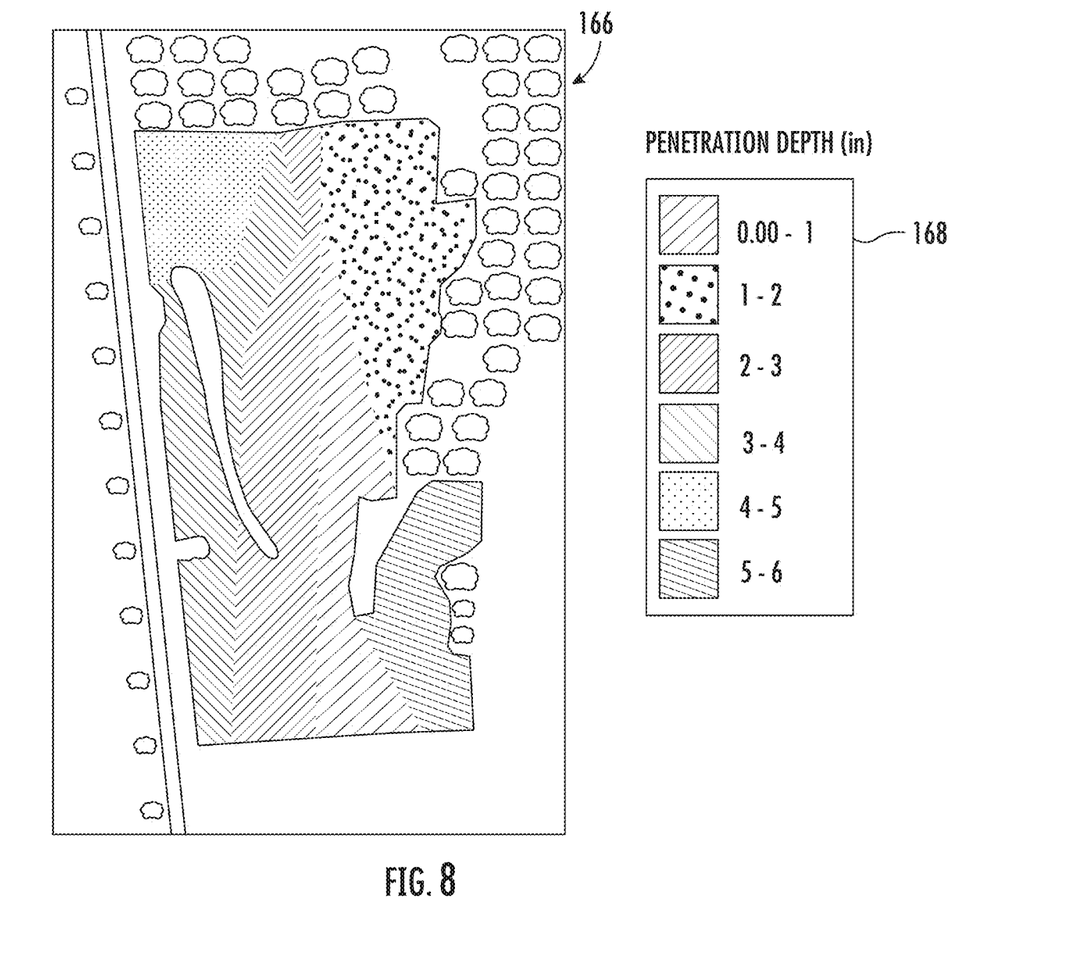
FIG. 8 illustrates a schematic diagram of one embodiment of a prescription map depicting the amount of available residue on a surface of a field in accordance with aspects of the present subject matter.

An example of one embodiment of a prescription map 166 according to the present disclosure is illustrated in FIG. 8. As shown in the illustrated embodiment, the tillage parameter corresponds to the penetration depth 168 of the front disk gangs 50 (FIGS. 1 and 2). In such embodiments, the prescription map 168 may be stored within the prescription map database 122 for subsequent processing and/or analysis, e.g. for use during a tillage operation to maintain the desired amount of residue coverage at each of the locations in the field.

Referring still to FIG. 3, in several embodiments, the instructions 116 stored within the memory 112 of the controller 102 may be executed by the processor(s) 110 to implement a tillage control module 126. In general, the tillage control module 126 may be configured to adjust the operation of the tillage implement 12 by controlling one or more components of the tillage implement 12 and/or the work vehicle 10. Specifically, in several embodiments, the tillage control module 126 may be configured to modify the operation of the tillage implement 12 in a manner designed to adjust the amount of crop residue remaining in the field. For instance, the tillage control module 126 may be configured to adjust the operation of the tillage implement 12 so as to increase or decrease the amount of crop residue remaining in the field.

It should be appreciated that the controller 102 may be configured to implement various different control actions to adjust the operation of the tillage implement 12 in a manner that increases or decreases the amount of crop residue remaining in the field according to the prescription map 168. For example, as shown in FIG. 3, the controller 102 may include a communications interface 128 to provide a means for the controller 102 to communicate with any of the various other system components described herein. More specifically, as shown, one or more communicative links or interfaces 132 (e.g., one or more data buses) may be provided between the communications interface 128 and the engine 22, the transmission 24, the control valves 130, and/or the like to allow the controller 102 to control the operation of such system components.

Particularly, in one embodiment, the controller 102 may be configured to actively adjust the tillage parameter of the one or more ground-engaging tools of the implement 12 according to the prescription map 168 to ensure that the desired amount of residue coverage is maintained at each of the locations in the field. More specifically, in one embodiment, the controller 102 may be configured to actively adjust the penetration depth of the front disk gangs 50 according to the prescription imp 168. In such embodiments, the front disk gangs 50 may be independently actuated from the remaining ground-engaging tools. Thus, as mentioned, the controller 102 may be communicatively coupled to one or more valves 130 configured to regulate the supply of fluid (e.g., hydraulic fluid or air) to one or more corresponding actuators 58 of the front disk gangs 50 of the tillage implement 12. In such an embodiment, by regulating the supply of fluid to the actuator(s) 58, the controller 102 may automatically and independently adjust the penetration depth, the down force, and/or any other suitable tillage parameter associated with the front disk gangs 58 with respect to the remaining ground-engaging tools. It should also be understood that the controller 102 may also be communicatively coupled to one or more valves 130 configured to regulate the supply of fluid (e.g., hydraulic fluid or air) to the remaining actuators 56, 60 of the other ground-engaging tools of the implement 12.

In additional embodiments, the system 100 may further include one or more depth sensors 134 communicatively coupled to the controller 102 for monitoring an actual penetration depth of the front disk gangs 50 so as to ensure the controller 102 is accurately following the depths set forth by the prescription map 166. More specifically, as shown, one or more communicative links or interfaces 136 (e.g., one or more data buses) may be provided between the communications interface 128 and the depth sensor(s) 134 to such that the controller 102 can receive the sensor data.

In another embodiment, the controller 102 may also be configured to increase or decrease the operational or ground speed of the implement 12 to affect an increase or decrease in the crop residue coverage. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the wok vehicle 10 and, thus, the ground speed of the tillage implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

Figure 9:
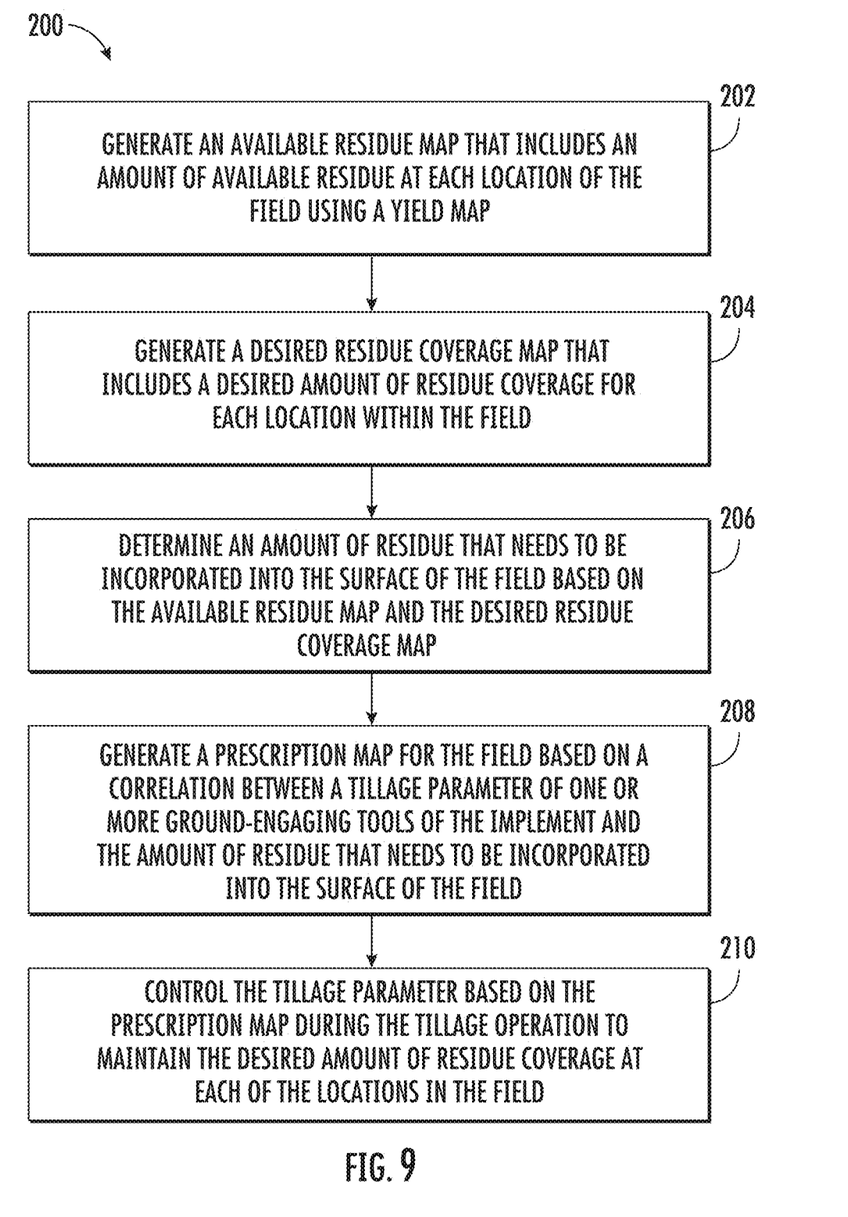
FIG. 9 illustrates a flow diagram of one embodiment of a method for maintaining a desired amount of residue coverage in a field during a tillage operation in accordance with aspects of the present subject matter.

Referring now to FIG. 9, a flow diagram of one embodiment of a method 200 for maintaining a desired amount of residue coverage in a field during a tillage operation is illustrated in accordance with aspects of the present subject matter. In general, the method 200 will be described herein with reference to the work vehicle 10 and the tillage implement 12 shown in FIGS. 1 and 2, as well as the various system components shown in FIG. 3. However, it should be appreciated that the disclosed method 200 may be implemented with work vehicles and/or tillage implements having any other suitable configurations and/or within systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (202), the method 200 may include generating an available residue map 150 that includes an amount of available residue at each location of the field using a yield map and/or crop biomass. As shown at (204), the method 200 also includes generating a desired residue coverage map 158 that includes a desired amount of residue coverage for each location within the field. As shown at (206), the method 200 includes determining an amount of residue that needs to be incorporated into the surface of the field based on the available residue map and the desired residue coverage map. For example, as mentioned, the controller 102 may generate a residue incorporation map 162 based on the available residue map 150 and/or the desired residue coverage map 158. Alternatively, the controller 102 may determine the amount of residue to incorporate into the soil using any other suitable data structures described herein or known in the art. As shown at (208), the method 200 includes generating a prescription map 166 for the field based on a correlation between a tillage parameter of one or more ground-engaging tools of the implement 12 and the amount of residue that needs to be incorporated into the surface of the field. As shown at (210), the method 200 includes controlling the tillage parameter based on the prescription map 166 during the tillage operation to maintain the desired amount of residue coverage at each of the locations in the field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for maintaining a desired amount of residue coverage in a field during a tillage operation, the method comprising:
   generating, with a computing device, an available residue map that includes an amount of available residue at each location of the field using a yield map and/or crop biomass;
   generating, with the computing device, a desired residue coverage map that includes a desired amount of residue coverage for each location within the field;
   determining, with the computing device, an amount of residue that needs to be incorporated into the surface of the field based on the available residue map and the desired residue coverage map;
   generating, with the computing device, a prescription map for the field based on a correlation between a tillage parameter of one or more ground-engaging tools of the implement and the amount of residue that needs to be incorporated into the surface of the field; and
   controlling the tillage parameter based on the prescription map during the tillage operation to maintain the desired amount of residue coverage at each of the locations in the field.

2. The method of claim 1, further comprising generating the yield map for the field or determining the crop biomass based on a relationship between crop yield of the field and the amount of residue on the surface of the field, the yield map or the crop biomass indicating crop yield at each of the locations within the field.

3. The method of claim 1, wherein the tillage parameter comprises at least one of a penetration depth or a down pressure associated with the one or more ground-engaging tools.

4. The method of claim 3, wherein the correlation comprises increased penetration depths corresponding to more residue being incorporated into the surface of the field and lesser penetration depths corresponding to less residue being incorporated into the surface of the field.

5. The method of claim 1, further comprising determining the desired residue coverage map based on at least one of a digital elevation map, elevation data of the field, soil type and/or texture, or soil compaction levels.

6. The method of claim 1, wherein the one or more ground-engaging tools comprise, at least, one or more front disk gangs.

7. The method of claim 6, further comprising separately controlling one or more of the penetration depths of the one or more front disk gangs from other ground-engaging tools.

8. The method of claim 1, further comprising generating the prescription map for the field based on the correlation between the tillage parameter of one or more ground-engaging tools of the implement, the amount of residue that needs to be incorporated into the surface at each of the locations within the field, and at least one additional parameter, the at least one additional parameter comprising at least one of clod size, soil type and/or texture, or moisture content.

9. The method of claim 1, wherein controlling the tillage parameter based on the prescription map during the tillage operation to maintain the desired amount of residue coverage at each of the locations in the field further comprises actively adjusting, with the computing device, the tillage parameter of the one or more ground-engaging tools of the implement according to the prescription map to ensure that the desired amount of residue coverage is maintained at each of the locations in the field.

10. A method for generating a prescription map for maintaining a desired amount of residue coverage in a field during a tillage operation, the method comprising:

generating, with a computing device, an available residue map that includes an amount of available residue at each location of the field using a yield map and/or crop biomass;

generating, with the computing device, a desired residue coverage map that includes a desired amount of residue coverage for each location within the field;

generating, with the computing device, a residue incorporation map that includes an amount of residue that needs to be incorporated into each location of the field based on the available residue map and the desired residue coverage map;

generating, with the computing device, a prescription map for the field based on a correlation between a penetration depth of one or more ground-engaging tools of the implement and the residue incorporation map; and storing the prescription map into at least one of a vehicle controller of a work vehicle or an implement controller of an implement for use during the tillage operation to maintain the desired amount of residue coverage at each of the locations in the field.

11. The method of claim 10, further comprising generating the yield map for the field or determining the crop biomass based on a relationship between crop yield of the field and the amount of residue on the surface of the field, the yield map or the crop biomass indicating crop yield at each of the locations within the field.

12. A system for maintaining a desired amount of residue coverage in a field during a tillage operation, the system comprising:

at least one controller for controlling a work vehicle and an implement during the tillage operation, the controller comprising at least one processor and associated memory, the memory storing instructions that, when implemented by the processor, configure the controller to perform one or more operations, the one or more operations comprising:

generating an available residue map that includes an amount of available residue at each location of the field using a yield map and/or crop biomass;

generating a desired residue coverage map that includes a desired amount of residue coverage for each location within the field;

determining an amount of residue that needs to be incorporated into the surface of the field based on the available residue map and the desired residue coverage map;

generating a prescription map for the field based on a correlation between a tillage parameter of one or more ground-engaging tools of the implement and amount of residue that needs to be incorporated into the surface of the field; and storing the prescription map in the memory for use during the tillage operation to maintain the desired amount of residue coverage at each of the locations in the field.

13. The system of claim 12, wherein the one or more operations further comprise generating the yield map for the field or determining the crop biomass based on a relationship between crop yield of the field and the amount of residue on the surface of the field, the yield map or the crop biomass indicating crop yield at each of the locations within the field.

14. The system of claim 12, wherein the one or more operations further comprise determining the desired residue coverage map based on at least one of a digital elevation map, elevation data of the field, soil type and/or texture, or soil compaction levels.

15. The system of claim 12, wherein the tillage parameter comprises at least one of a penetration depth or a down pressure associated with the one or more ground-engaging tools.

16. The system of claim 15, wherein the one or more ground-engaging tools comprise, at least, one or more front disk gangs.

17. The system of claim 16, further comprising one or more actuators communicatively coupled to the at least one controller for separately controlling the one or more front disk gangs from other ground-engaging tools.

18. The system of claim 16, further comprises one or more sensors communicatively coupled to the at least one controller for monitoring an actual penetration depth of the one or more front disk gangs.

19. The system of claim 12, wherein the one or more operations further comprises generating the prescription map for the field based on the correlation between the tillage parameter of one or more ground-engaging tools of the implement, the amount of residue that needs to be incorporated into the surface at each of the locations within the field, and at least one additional parameter, the at least one additional parameter comprising at least one of clod size, soil type and/or texture, or moisture content.

20. The system of claim 12, wherein the one or more operations further comprise actively adjusting the tillage parameter of the one or more ground-engaging tools of the implement according to the prescription map to ensure that the desired amount of residue coverage is maintained at each of the locations in the field.

* * * * *